March 9, 1948.  R. H. ANDERSON  2,437,494
KNOCKDOWN ARTICLE AND JOINT THEREFOR
Filed Nov. 19, 1945
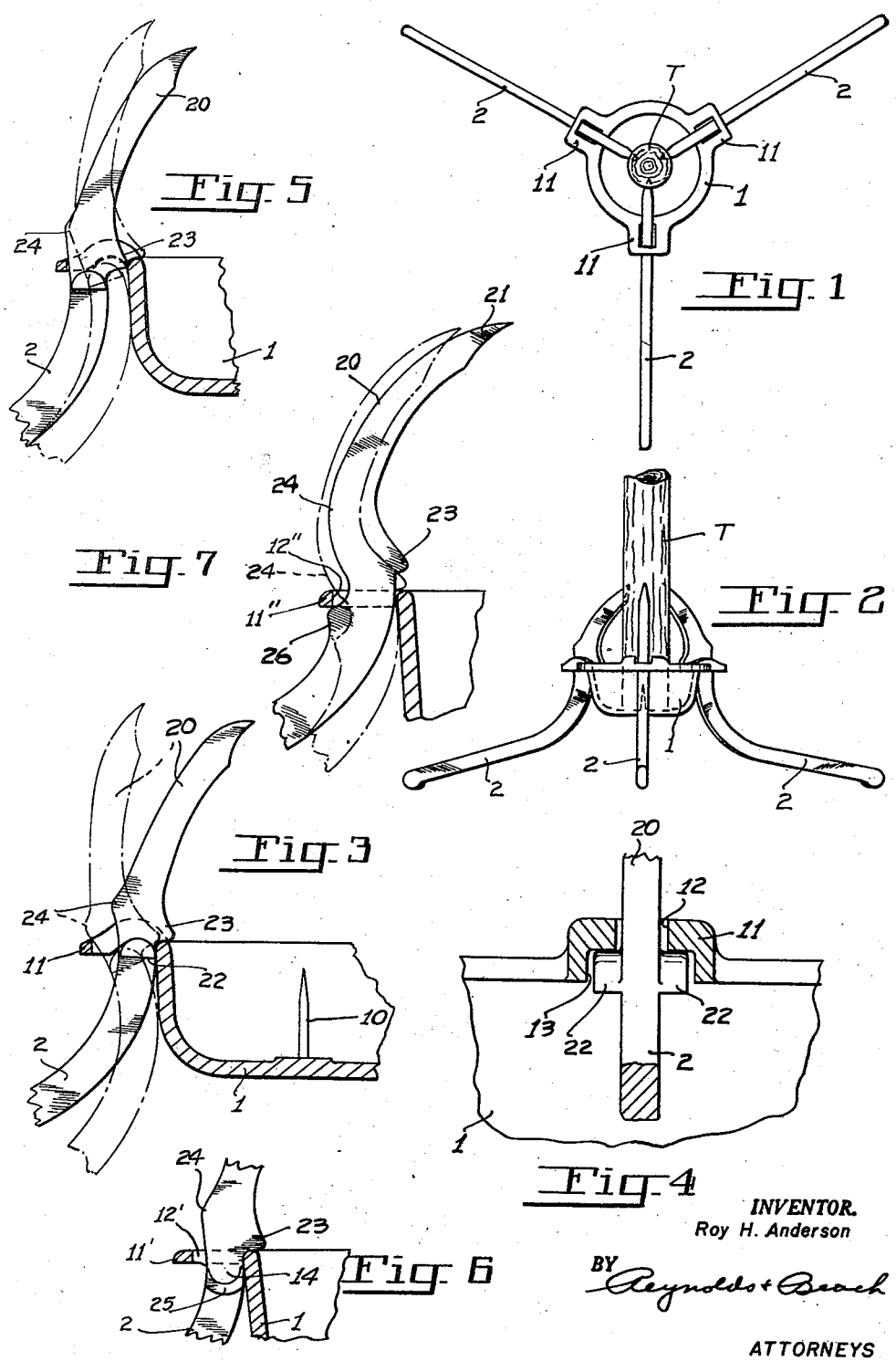
INVENTOR.
Roy H. Anderson
BY
ATTORNEYS Patented Mar. 9, 1948

2,437,494

UNITED STATES PATENT OFFICE 2,437,494

KNOCKDOWN ARTICLE AND JOINT THEREFOR

Roy H. Anderson, Fort Dodge, Iowa

Application November 19, 1945, Serial No. 629,486

5 Claims. (Cl. 248—48)

This invention pertains to knockdown articles, such, for example, as a stand for a Christmas tree, a flagpole, or other post, and additionally to a unique type of bar-to-plate joint which may be used for removably interconnecting the legs and base of such a stand. It will be understood, however, that such a bar-to-plate joint will have other applications in a variety of knockdown articles.

The principal object of my invention, therefore, is to render a bar element of a knockdown article, such as the leg of a stand for Christmas trees and similar articles, readily and completely removable from a body or base portion. The joint used between the bar and body is such that the bar will not inadvertently fall from the body when the latter is picked up. Another advantage of the joint is that reasonable latitude of adjustment is provided to dispose the bar in various swung positions relative to the body. Despite these advantages, the bar can be separated from the body quickly and replaced with equal ease, and when the parts are engaged the joint will transmit forces in various directions.

In the fabrication of such joints it is an object to employ simple constructions, and particularly those which can be manufactured economically. The parts do not require machining operations, but may be cast to final form, or for some purposes may be forged, or merely punched and stamped. Such forming operations lend themselves well to economical mass production.

A further advantage of my construction is that, in achieving the aforementioned objects, the structure incorporates a minimum of parts. The capabilities of the joint result simply from the formation of the bar and the socket of the body in which it is inserted, no attaching or latching element interconnecting the bar and body being required.

Additional advantages of my knockdown article construction, and more especially of the particular types of joint selected for illustration, will be discussed in the following description. While three different modifications of the joint are shown in the drawings various features of them may be altered for special applications within the scope of my invention as defined in the appended claims.

Figure 1 is a plan view, and Figure 2 is an elevational view of a representative knockdown article taking the form of a stand for Christmas trees or equivalent articles and having removable legs.

Figure 3 is a fragmentary sectional view of the stand illustrating a leg in tree-securing and in released positions, and Figure 4 is a sectional view taken perpendicular to Figure 3.

Figure 5 is a fragmentary sectional view similar to Figure 3, but showing successive positions through which the leg is moved in assembling the stand.

Figure 6 is a fragmentary sectional view similar to Figure 3 showing a modified type of joint structure.

Figure 7 is a fragmentary sectional view similar to Figure 3 showing a still further modification of the joint.

The stand shown in the drawings has been selected merely as representative of a typical type of knockdown article incorporating a body or base having a generally plate-like structure on which the legs are mounted. A bar joint of the type used for a stand leg has similar advantages for other types of articles which it is desirable to disassemble easily and quickly.

The stand includes a body or base 1 which is preferably in the form of a cup. Projecting upward from the center of this base is a sharp pointed pin 10, which may be a galvanized roofing nail having its head cast in the bottom of the cup 1. This pin may be forced into the lower end of the article to be supported, such as the tree trunk T, and water may be placed in the cup to keep the tree fresh. In order to support the cup in a stable fashion a plurality of legs 2, preferably three in number, are attached to it at locations equally spaced angularly about it, as shown in Figure 1. The tree is stabilized in the stand by forming each leg with an extension 20 projecting a substantial distance above the rim of the cup and terminating in points 21 which are embedded in the tree.

Firm engagement of each point 21 with the tree trunk T is insured by constructing the joints between the leg bars 2 and the body 1 to enable each leg to swing through a substantial angle about a horizontal axis disposed generally tangentially of the base. The weight of the tree and base will tend to swing the legs 2 downward relative to their floor engaging ends, and such downward swinging will move the points toward each other to fix them securely in the tree.

Because of its width and height such a Christmas tree stand would require considerable room in which to store it between Christmas seasons, if the legs were not removable. By the use of my unique joint each leg bar 2 may easily be separated completely from the cup 1, so that these parts may be stored separately in small space. Such joint may take one of several forms, but in any event it is essentially of the bar-to-plate type. Thus the rim of the base cup is extended at circumferentially spaced locations, corresponding to the positions of legs 2, to form plate-like ears 11, each ear having in it a socket aperture 12 into which a leg bar may be inserted.

The ears of the particular type of joint shown in Figures 1 to 4, inclusive, are not perfectly planar, although they may be generally designated as plate-like. As shown best in Figures 3 and 4 each ear is bulged upward slightly and has in its under side a generally semi-cylindrical recess, its length extending tangentially of the cup 1 and perpendicular to the length of the socket aperture or slot 12. Preferably the slot is arranged centrally of the recess, but such relationship is not essential. This ear conformation may be cast sufficiently accurately so that no finishing operation ordinarily is required, although it would be possible to broach the slot 12 to its finished dimensions in applications of this joint where a high degree of accuracy is desirable to provide a close fit between the bar and its socket.

The leg bar 2, as shown best in Figure 4, has on its opposite sides two lugs 22 projecting oppositely from it at the region of the joint, which lugs are of semicylindrical contour and of a length appropriate to fit recess 13 of an ear 11, when the bar has been inserted through the socket slot 12 of such ear. The width of the bar immediately above such lugs is sufficiently less than the corresponding width of the aperture to afford substantial relative swinging movement of the bar and joint in a single plane perpendicular to such lugs.

When the body of a leg 2 is rocked downward relative to its lower floor engaging end its end 20 projecting upwardly above the rim of cup 1 will be rocked inward. This position of the leg is shown in broken lines in Figure 3. In that attitude a shoulder formed by a projection 23 on the inner edge of the bar engages the upper side of the ear or the rim of the cup at the inner end of aperture 12. In this position the longer sides of the aperture will lie close to the side faces of the bar, as shown in Figure 4, which together with the engagement of lugs 22 in recess 13 will prevent appreciable sidewise tilting of the legs.

When the Christmas tree is lifted to take its weight off legs 2 and it is pulled upward from the base 1, points 21 of the legs will be pressed out of the tree, and their heavy lower ends will swing downward to rock the upper end 20 of each leg into the broken line position of Figure 3. Despite release of the tree, however, the legs will not fall out of their socket apertures. The outward movement of the upper end 20 of each bar about the shoulder beneath its projection 23 as a fulcrum point will move projection 24, on the outer edge of the bar and closely spaced from projection 23 lengthwise of the bar, into engagement with the outer end of slot 12. In addition the curved portion of the leg just below lugs 22 will engage the side of the body 1.

The projections 23 and 24 are spaced apart only a small distance lengthwise of the leg. While the width of the leg between these projections measured most directly is less than the corresponding width of the socket aperture, the maximum width of the bar measured in a direction transversely of it to include such projections is greater than such width of the socket. As the leg tends to move generally lengthwise downward, therefore, projections 23 and 24 will engage the opposite ends of slot 12, as shown in Figure 3. Appreciable lengthwise movement of the leg will thus be prevented and it will be suspended from the body.

The manner in which the leg bar is manipulated for insertion into its socket slot is shown in Figure 5. The lower end of the bar is raised sufficiently to swing the outer projection 24 into a position a substantial distance above the inner projection 23, as shown in solid lines in Figure 5. As stated, the minimum width of the bar in the section intermediate these two projections is sufficiently small that the bar will pass through slot 12. As soon as the bar and body have been moved relatively generally in the direction of the length of the bar far enough the bar may be shifted to the right transversely of its length to lodge projection 23 above the inner end of the slot 12. As previously described, if the bar is now released its lower end will swing downward to dispose the leg in the broken line position shown in Figure 3, or the lower end of the leg may be swung farther upward to engage its point 21 with a Christmas tree trunk in the manner shown in solid lines. The leg bar may be disassembled from the body easily by performing the same steps in reverse sequence.

The shapes of the ears on body 1, and of the lugs projecting transversely from the leg, may be altered to those shown in Figure 6. In this instance the upper side of each ear is planar, and the aperture 12' is substantially the same as aperture 12 in the previously described form. Instead of the under side of ears 11' being recessed, however, it has ribs 14 of generally semi-cylindrical shape projecting downward from its under surface on opposite sides of slot 12', which ribs extend tangentially of the base 1.

The formation of the upper and lower portions of the leg fitting the type of socket shown in Figure 6 may be exactly the same as such parts of the legs shown in Figures 1 to 5, inclusive, described above. Moreover, this leg has projections 23 and 24 on its inner and outer edges which may be of exactly the same size and shape as such other legs. Thus the difference in leg profile lies solely in the shape of the lugs 25 projecting transversely from the leg. In this instance the upper side of the lugs preferably are substantially semi-cylindrically concave, being shaped complementally to the under sides of ribs 14. The shape of the under sides of lugs 25 is immaterial, but conveniently they may be convexly curved concentrically with their upper sides.

When the legs shown in Figure 6 are in the tree-engaging position shown in solid lines in that figure, the base 1 and the tree may rest on the legs through the engagement of the ribs 14 with lugs 25. The manner in which each leg in inoperative position is suspended, by its projections 23 and 24 engaging its ear 11', in this instance is precisely the same as described in connection with the broken line showing of the leg in Figure 3. Also the manner in which the leg is manipulated for its insertion into the socket aperture 12' is exactly like that discussed with reference to Figure 5.

The base 1 of the stand preferably is formed by casting it of metal, such as an aluminum alloy. The legs likewise may be cast of similar metal, and they will be ready for assembly with the base into operative position without requiring that any parts of the body or of the legs be machined. Because of the necessity of providing lugs either of the type designated 22 in Figures 3 and 4, or of the type numbered 25 in Figure 6, it is hardly feasible to fabricate the legs by stamping without some additional operation being required, such as welding or otherwise securing lugs to the legs.

The type of leg bar shown in Figure 7 does not require transverse lugs of any type, and it, therefore, is particularly well adapted to fabrication by a stamping operation, although it may be cast if desired. In this instance also the profile of the lower end of the leg and of the upwardly projecting end 20 may be precisely the same as those of the two types of legs described previously. The difference in profile resides in that region embracing the section which passes through the socket aperture in an ear of base 1.

Since in the form of joint shown in Figure 7 the leg bar 2 has no laterally projecting lugs, it is not necessary for the ears 11" projecting from the body 1 to have either a recess in their under sides, as shown in Figures 3 and 4, or ribs projecting below such under side, as shown in Figure 6. The ears may therefore have perfectly planar upper and lower sides. The socket aperture 12" may be generally of the same width and length as the apertures in the ears previously described.

On its inner edge this leg 2 has a projection 23 similar to that of the leg forms previously discussed, and further has an equivalent projection 24 on its outer edge, which may be more or less pronounced. The shape of the bar portion joining the region of the bar at the projection 24 and its upwardly projecting end 20 is immaterial. In this instance also the essential consideration is that the width of the leg including projections 23 and 24 be greater than the corresponding width of the socket aperture 12". When the leg is rocked into the broken line position shown in Figure 7, in which the portion of the leg's inner edge slightly below projection 23 engages the outer wall of cup 1, such wider leg portion will prevent downward movement of the leg by bridging its socket aperture.

The principal difference of the leg 2 shown in Figure 7 over those of Figures 3 and 6 is the provision of a pronounced projection 26 on the outer edge of the leg, and spaced below projection 23 a distance sufficiently greater than the thickness of the ear 11" to afford clearance to enable the leg and body to swing relatively. When the leg is rocked about the shoulder beneath the projection 23 to swing the upper end 20 of the leg inwardly, projection 26 will approach the outer end of socket slot 12". As the weight of the tree and the downward force applied to it acts on cup 1, however, the cup will be moved downward slightly as inward swinging of the upper leg portion 20 continues, until the outer end of slot 12" rests on the projection 26 in the position shown in solid lines in Figure 7. In that position it will be seen that the projection 23 is spaced an appreciable distance above ear 11" and the rim of cup 1. If the tree trunk were of smaller diameter this spacing would be less, and conversely, if the tree trunk were larger this spacing would be greater.

When the tree is lifted points 21 will be forced out of it, and the leg will swing to the broken line position shown without dropping free of its socket, just as in the case of the other forms of joint. Moreover this leg also is inserted into its socket aperture and removed from it by manipulating the leg in exactly the same manner as described in connection with the leg form shown in Figure 5.

Whichever type of joint structure is employed, the stand is prepared for use by first inserting each leg into its body socket. Next the end of the tree trunk or pole is inserted between the upper ends of the legs before their lower ends are placed on the floor, and such trunk is pressed onto pin 10 almost to the bottom of it. The stand legs are then set on the floor to effect swinging of the points 21 into engagement with the tree. A downward force applied to the tree trunk will set the points securely, and the weight of the tree exerted through the cup 1 on legs 2 will maintain the points in such engagement.

I claim as my invention:

1. A knockdown article comprising a body having a socket aperture in a plate-like portion thereof, and a bar engageable in said socket aperture by relative movement of said bar and said body non-rotatively and generally lengthwise of said bar, said bar having three projections spaced lengthwise thereof, the intermediate projection and one of the other projections projecting from different edges of said bar and being spaced apart lengthwise thereof a distance slightly greater than the thickness of said plate-like body portion, the width of said bar between such projections being sufficiently less than the corresponding width of said socket aperture as to enable said bar and said body to swing relatively through a substantial angle, and the other of said projections projecting from the edge of said bar opposite that from which said intermediate projection projects and being disposed lengthwise of said bar close to said intermediate projection, the projections at opposite sides of said intermediate projection being engageable with opposite sides of said plate-like portion, respectively, to limit relative movement of said bar and body generally lengthwise of said bar.

2. A knockdown article comprising a body having a socket aperture in a plate-like portion thereof, and a bar engageable in said socket aperture by relative movement of said bar and said body non-rotatively and generally lengthwise of said bar, said bar having three projections spaced lengthwise thereof, the intermediate projection and one of the other projections projecting from different edges of said bar and being spaced apart lengthwise thereof a distance slightly greater than the thickness of said plate-like body portion, the width of said bar between such projections being sufficiently less than the corresponding width of said socket aperture as to enable said bar and said body to swing relatively through a substantial angle, and the other of said projections projecting from the edge of said bar opposite that from which said intermediate projection projects and being disposed lengthwise of said bar close to said intermediate projection, the maximum width of said bar measured in a direction transversely thereof to include such other projection and said intermediate projection being greater than the corresponding width of said socket aperture by conjoint engagement with one side of said plate-like portion to limit relative movement of said bar and body generally lengthwise of said bar in one direction.

3. A knockdown article comprising a body having a socket aperture in a plate-like portion thereof, and a bar engageable in said socket aperture by relative movement of said bar and said body non-rotatively and generally lengthwise of said bar, said bar having three projections spaced lengthwise thereof, the intermediate projection projecting from one edge thereof and the other projections projecting from the opposite edge thereof, said intermediate projection being spaced from one of the other projections lengthwise of said bar a distance slightly greater than the thickness of said plate-like body portion, the width of said bar between such projections being sufficiently less than the corresponding width of said socket aperture to enable said bar and said body to swing relatively through a substantial angle, and said intermediate projection being close to the other of said projections, the projections at opposite sides of said intermediate projection being engageable with opposite sides of said plate-like portion, respectively, to limit relative movement of said bar and body generally lengthwise of said bar.

4. A knockdown article comprising a body having a socket aperture in a plate-like portion thereof, and a bar engageable in said socket aperture by relative movement of said bar and said body non-rotatively and generally lengthwise of said bar, said bar having three projections spaced lengthwise thereof, the intermediate projection projecting from one edge thereof and the other projections projecting from the opposite edge thereof, said intermediate projection being spaced from one of the other projections lengthwise of said bar a distance slightly greater than the thickness of said plate-like body portion, the width of said bar between such projections being sufficiently less than the corresponding width of said socket aperture to enable said bar and said body to swing relatively through a substantial angle, and said intermediate projection being close to the other of said projections, the maximum width of said bar measured in a direction transversely thereof to include such other projection and said intermediate projection being greater than the corresponding width of said socket aperture by conjoint engagement with one side of said plate-like portion to limit relative movement of said bar and body generally lengthwise of said bar in one direction.

5. A knockdown article comprising a body having a socket aperture in a plate-like portion thereof, and a bar engageable in said socket aperture by relative movement of said bar and said body non-rotatively and generally lengthwise of said bar, said bar having two projections projecting from opposite edges thereof and spaced apart slightly lengthwise thereof, and further having lugs spaced lengthwise from one of said projections a distance slightly greater than the thickness of said plate-like body portion and projecting oppositely from said bar in directions generally perpendicular to the directions in which said projections project, the width of said bar between said lugs and the adjacent one of said projections being sufficiently less than the corresponding width of said socket aperture to enable said bar and said body to swing relatively through a substantial angle, and the maximum width of said bar measured in a direction transversely thereof to include said projections being greater than the corresponding width of said socket aperture, said projections by conjoint engagement with one side of said plate-like portion, and said lugs by engagement with the other side of said plate-like portion, limiting relative movement of said bar and body generally lengthwise of said bar.

ROY H. ANDERSON.

REFERENCES CITED

The following references are of record in the file of this patent:

UNITED STATES PATENTS

| Number | Name | Date |
|---|---|---|
| 523,376 | Pruckner | July 24, 1894 |
| 589,896 | Jarboe | Sept. 14, 1897 |
| 883,235 | Rauch | Mar. 31, 1908 |
| 2,028,129 | Allerton | Jan. 21, 1936 |
| 2,071,887 | Malin et al. | Feb. 23, 1937 |